(12) United States Patent
Ghadge et al.

(10) Patent No.: US 11,907,079 B2
(45) Date of Patent: Feb. 20, 2024

(54) SYSTEM AND METHOD FOR REDUNDANT BACKUP OF DATASETS

(71) Applicant: Druva Inc., Sunnyvale, CA (US)

(72) Inventors: Sandeep Ghadge, Pune (IN); Sudeep Jathar, Pune (IN)

(73) Assignee: Druva Inc., Sunnyvale, CA (US)

( * ) Notice: Subject to any disclaimer, the term of this patent is extended or adjusted under 35 U.S.C. 154(b) by 0 days.

(21) Appl. No.: 17/585,216

(22) Filed: Jan. 26, 2022

(65) Prior Publication Data

US 2023/0161670 A1    May 25, 2023

(30) Foreign Application Priority Data

Nov. 23, 2021  (IN) .............................. 202141053813

(51) Int. Cl.
    *G06F 11/14*     (2006.01)
(52) U.S. Cl.
    CPC ...... *G06F 11/1464* (2013.01); *G06F 11/1451* (2013.01); *G06F 11/1461* (2013.01); *G06F 11/1469* (2013.01)
(58) Field of Classification Search
    CPC ............. G06F 11/1464; G06F 11/1451; G06F 11/1461; G06F 11/1469
    USPC ......................................................... 714/14
    See application file for complete search history.

(56) References Cited

U.S. PATENT DOCUMENTS

| | | | | |
|---|---|---|---|---|
| 2006/0001176 | A1* | 1/2006 | Fukaishi | G11C 5/02 257/777 |
| 2009/0279556 | A1* | 11/2009 | Selitser | H04L 67/1001 370/401 |
| 2015/0043570 | A1* | 2/2015 | Filsfils | H04L 41/0813 370/351 |

* cited by examiner

*Primary Examiner* — Yair Leibovich
(74) *Attorney, Agent, or Firm* — IceMiller LLP

(57) ABSTRACT

A system for dynamically optimizing redundant backup of one or more data sets of a plurality of data sets from a client device to a tertiary storage is presented. The system includes a user input module, a parameter comparison module, a backup path selector, and a redundant backup module. The system is configured to dynamically switch between two backup paths including: (A) direct redundant backup of the data set from the client device to the tertiary storage, or (B) back up of the data set from the client device to a secondary storage and redundant backup of the data set from the secondary storage to the tertiary storage. A related method is also presented.

20 Claims, 8 Drawing Sheets

SYSTEM AND METHOD FOR REDUNDANT BACKUP OF DATASETS

CROSS REFERENCE TO RELATED APPLICATION

This application claims a benefit of, and priority to, India Patent Application No. 202141053813, filed Nov. 23, 2021, the contents of which is incorporated by reference in its entirety.

BACKGROUND

Embodiments of the present invention generally relate to systems and methods for redundant backup of datasets, and more particularly to systems and methods for rules-based redundant backup of datasets.

Data protection plays a critical role in data loss and disaster situations. Business continuity and data recovery depend on backup data availability and data potency. Successful data recovery is dependent on the availability and integrity of data blocks available in backup copies. However, the backup copy may be vulnerable to certain situations such as backup data corruption, accidental deletion, insider intentional deletion, deletion after retention expiry, datacenter outage, data block degeneration, and the like.

Thus, there is a need for systems and methods that provide for redundant backup of data. Further, there is a need for systems and methods that provide for redundant backup of data by optimizing performance and/or cost.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for dynamically optimizing redundant backup of one or more data sets of a plurality of data sets from a client device to a tertiary storage is presented. The system includes a user input module configured to receive, from a user, a backup parameter to be optimized for a dataset of the plurality of datasets and a corresponding threshold limit for the backup parameter. The system further includes a parameter comparison module configured to compare, for a duration of the redundant backup, a current value of the backup parameter and the threshold limit. The system moreover includes a backup path selector configured to select a path for the redundant backup of the data set based on the comparison. The selected path includes one of: (A) direct redundant backup of the data set from the client device to the tertiary storage, or (B) back up of the data set from the client device to a secondary storage and redundant backup of the data set from the secondary storage to the tertiary storage. The system furthermore includes a redundant backup module configured to perform redundant backup of the data set by dynamically switching between the backup paths based on the selected backup path.

According to another example embodiment, a method for dynamically optimizing redundant backup of one or more data sets of a plurality of data sets from a client device to a tertiary storage is presented. The method includes receiving a user input including a backup parameter to be optimized for a dataset of the plurality of datasets and a threshold limit for the backup parameter. The method further includes comparing, for a duration of the redundant backup, a current value of the backup parameter and the threshold limit. The method moreover includes selecting a path for the redundant backup of the data set based on the comparison. The selected path includes one of: (A) direct redundant backup of the data set from the data source to the tertiary storage, or (B) back up of the data set from the client device to a secondary storage and redundant backup of the data set from the secondary storage to the tertiary storage. The method furthermore includes performing redundant backup of the data set by dynamically switching between the backup paths based on the selected path.

According to another example embodiment, a system for optimizing redundant backup of one or more data sets of a plurality of data sets from a client device to a tertiary storage is presented. The system includes a user input module configured to receive, from a user, a threshold limit for an egress cost of transferring data from the client device to the tertiary storage. The system further includes a parameter comparison module configured to compare the egress cost and the threshold limit. The system moreover includes a backup path selector configured to select a path for the redundant backup based on the comparison. The selected path includes one of: (A) direct redundant backup of the data set from the client device to the tertiary storage, or (B) back up of the data set from the client device to a secondary storage and redundant backup of the data set from the secondary storage to the tertiary storage. The system furthermore includes a redundant backup module configured to perform redundant backup of the data set based on the selected path.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
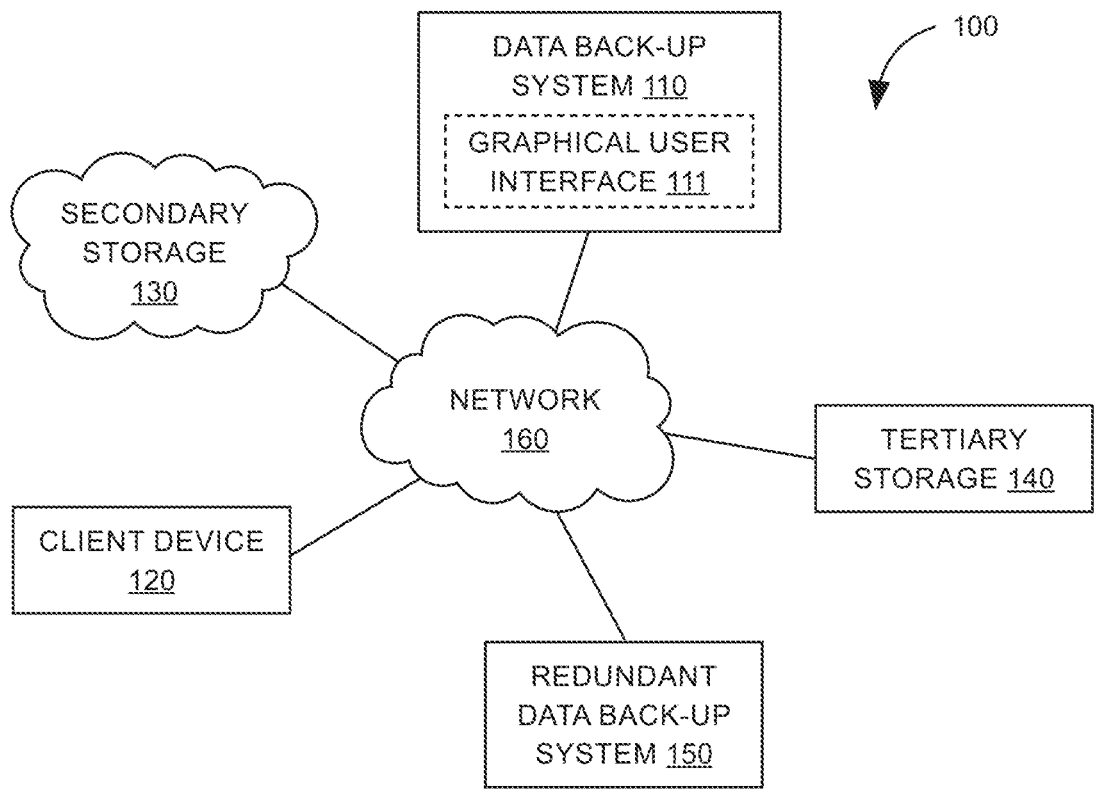
FIG. 1 is a block diagram illustrating an example data backup environment, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently, or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods to optimize redundant backup of one or more data sets from a client device to a tertiary storage. The term "redundant backup" as used herein refers to a secondary or redundant copy of the one or more data sets that is stored on a tertiary storage that is different from a secondary storage where the primary back up of the one or more data sets is stored.

FIG. 1 illustrates an example data backup environment 100 (referred to herein as system environment 100), in accordance with embodiments of the present description. The data backup environment 100 includes a data backup system 110, one or more client devices 120, a secondary data storage 130, a tertiary data storage 140, and a redundant backup system 150.

The system environment 100 may be configured to store one or more datasets from one or more client device 120 in the secondary data storage 130 using the data backup system 110. Further, the system environment 100 may be configured to preform redundant backup of the one more data set on the tertiary data storage 140 using the redundant backup system 150. As described in detail later, although the tertiary data source 140 and the client device 110 are represented as two different blocks, the tertiary data storage 140 may be present in the client device 110 itself. Similarly, although the data backup system 110 and the redundant backup system 150 are represented as two different blocks, in some embodiments, the redundant backup system 150 may be present in the data backup system 110 itself.

The data backup system 110 may be a software or a hardware component that enables the one or more client device 120 to back up and index data and optionally also search and access the backup data. In some embodiments, the data backup system 110 is a cloud-based service. The data backup system 110 may optionally further provide a graphical user interface 111 for individual clients to access data storage for cloud data management. For example, a graphical user interface 111 may be a front-end cloud storage interface. Additionally, or alternatively, the data backup system 110 may provide APIs for the access and management of files from the data storage.

The data backup system 130 may be configured to perform the full backup as well as incremental data backup. An incremental data backup is a type of backup that copies only data that was changed since the previous backup. Unlike a full backup where all data is copied to the backup storage with every backup job, after an instance of a full backup, the incremental approach only allows backup of files and blocks that were changed since the most recent backup. Thus, incremental backup reduces storage requirements, bandwidth load, and provides the necessary level of data consistency and availability.

The backup schedule for the client device 120 may be installed with a client utility application, configured within the host operating system (OS) or in a control plane hosted in a cloud environment. At the scheduled time, the client device 120 may connect with the data secondary storage via the data backup system 110 to initiate the data backup process. (either full or incremental). For example, the first instance of data backup may involve a full backup of the data from the client device 102 to the secondary data storage 130, followed by incremental backups depending on the backup schedule.

The one or more client devices 120 (referred to herein as "device") may be any computing devices that have data that may need backup. Examples of such devices 120 include without limitation, workstations, personal computers, desktop computers, virtual machines, databases, docker containers, or other types of generally fixed computing systems such as mainframe computers, servers, and minicomputers. Other examples of such devices 120 include mobile or portable computing devices, such as one or more laptops, tablet computers, personal data assistants, mobile phones (such as smartphones), IoT devices, wearable electronic devices such as smartwatches, and other mobile or portable computing devices such as embedded computers, set-top boxes, vehicle-mounted devices, wearable computers, etc. Servers can include mail servers, file servers, database servers, virtual machine servers, and web servers.

In some embodiments, the system environment 100 includes a plurality of devices 120. The plurality of devices 120 may be from a single client or different clients being serviced by the system environment 100. In some embodiments, the system environment 100 includes a single device 120 having a plurality of data sets or one large data set that needs backup.

The one or more datasets generally include data generated by the operating system and/or applications executing on the client device 120. In general, the data present in the one or more data set may include files, directories, file system volumes, data blocks, extents, or any other hierarchies or organizations of data objects. As used herein, the term "data object" refers to (i) any file that is currently addressable by a file system or that was previously addressable by the file system (e.g., an archive file), and/or to (ii) a subset of such a file (e.g., a data block, an extent, etc.). The data present in the one or more datasets may further include structured data (e.g., database files), unstructured data (e.g., documents), and/or semi-structured data.

The one or more datasets further include associated metadata. Metadata generally includes information about data objects and/or characteristics associated with the data objects. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications and/or other components of the client device 120 maintain indices of metadata for data objects, e.g., metadata associated with individual email messages.

In some embodiments, the secondary data storage 130 is a cloud-based storage. The data sets from the one or more devices 120 may be stored and backed up in an object-based storage, a file-based storage, or a block-based storage. Non-limiting examples of suitable secondary data storage 130 include AMAZON S3, RACKSPACE CLOUD FILES, AZURE BLOB STORAGE, and GOOGLE CLOUD STORAGE. In some embodiments, the secondary data storage 130 is an object-based storage, such as AMAZON S3.

In some embodiments, the tertiary data storage 140 may be packaged/configured with the client device 120 (e.g., an internal hard disk) and/or maybe external and accessible by the client device 120 (e.g., network-attached storage, a storage array, etc.). Non-limiting examples of tertiary data storage 140 include, without limitation, disk drives, storage arrays (e.g., storage-area network (SAN) and/or network-attached storage (NAS) technology), semiconductor memory (e.g., solid-state storage devices), network-attached storage (NAS) devices, tape libraries, or other magnetic, non-tape storage devices, optical media storage devices, or combinations thereof. In some other embodiments, the tertiary data storage 140 is provided in a cloud storage environment (e.g., a private cloud or one operated by a third-party vendor). The cloud storage environment may be a virtual private cloud, or any public cloud region which could be present in any physical geographic region.

In certain embodiments, the tertiary data storage 140 is provided by the client itself. Non-limiting examples of the tertiary data storage 140 in such instances include on-premise storage (e.g., internal hard disk, network-attached storage, and the like), client's AWS account, or another cloud-based storage (e.g, S3, Azure, and the like)

The various components in the system environment 100 may communicate through the network 160 and/or locally. For example, in some embodiments, one of the system components may communicate locally with the data backup system 110, while other components communicate with the data backup system 110 through the networks. In other embodiments, every component in the system environment 100 is online and communicates with each other through the network 160. In one embodiment, the network 160 uses standard communications technologies and/or protocols. Thus, the network 160 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the data backup system 110, the client device 120, the secondary data storage 130, the tertiary data storage 140, and the redundant backup system 150 are each represented by a single block in FIG. 1, each of these components may include multiple distributed and/or independent computers (may also be referred to as workers) working cooperatively and in parallel with other computers so that the operation of the entire system will not be affected when one or more workers are down.

Figure 2:
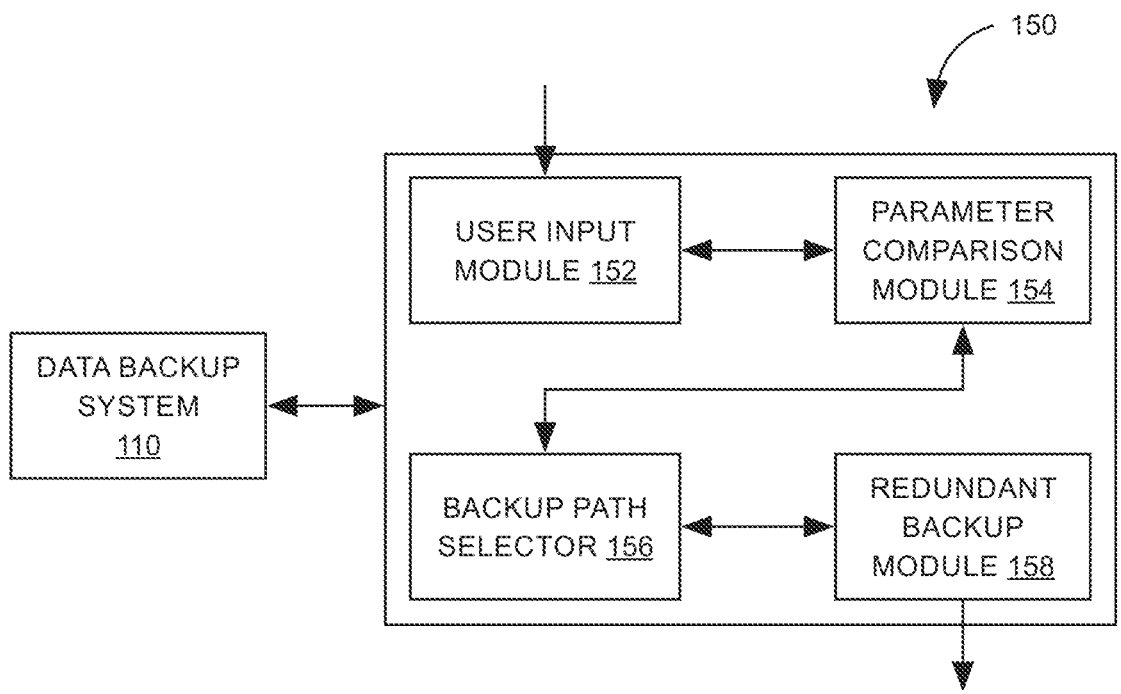
FIG. 2 is a block diagram illustrating an example redundant data backup system, according to some aspects of the present description.

FIG. 2 is a block diagram of an example redundant backup system 150 (hereinafter referred to as "system"), in accordance with some embodiments of the present description. The system 150 is configured to dynamically optimize redundant backup of one or more data sets of a plurality of data sets from a client device to a tertiary storage. The system 150 includes a user input module 152, a parameter comparison module 154, a backup path selector 156, and a redundant backup module 158. Each of these components is described in detail below.

The user input module 152 is configured to receive, from a user, a backup parameter to be optimized for a dataset of the plurality of datasets and a corresponding threshold limit for the backup parameter. The backup parameter is a backup rate or a backup cost per month. Optimizing the backup rate may allow the user to optimize the performance of the redundant backup. Similarly, optimizing the backup cost per month may allow the user to optimize the redundant backup cost.

In some embodiments, the system 150 is configured to allow the user to change the backup parameter between different data sets of the plurality of data sets. For example, the user may decide to optimize the backup rate (i.e., performance) for one or more data sets that may be critically important. For other datasets, the user may decide to optimize the cost per month thus optimizing both the performance and cost based on the dataset.

In some embodiments, the system 150 is configured to allow the user to select a first backup parameter for an initial redundant backup of the data set and a second backup parameter for any subsequent incremental redundant backups of the dataset. For example, the user may decide to optimize the backup rate (i.e., performance) for initial full redundant backup. For any subsequent incremental redundant backups, the user may decide to optimize the cost per month thus optimizing both the performance and cost for the redundant backup. Further, the system 150 is configured to allow the user to change the threshold limit for the backup parameter during the duration of the redundant backup.

The parameter comparison module 154 is communicatively coupled to the user input module 152 and the data backup system 110. The parameter comparison module 154 is configured to receive the input parameter to be optimized and the corresponding threshold limit from the user input module 152. In some embodiments, the parameter comparison module 154 may be further configured to receive a current value of the backup parameter, for example, from the backup system 110.

The parameter comparison module 154 is further configured to compare the current value of the backup parameter to the threshold limit. In some embodiments, the parameter comparison module 154 is configured to compare the current value of the backup parameter to the threshold limit continuously. In some embodiments, the parameter comparison module 154 is configured to determine, for a duration of the redundant backup, whether a current value of the backup parameter is less than or greater than the threshold limit.

Figure 3:
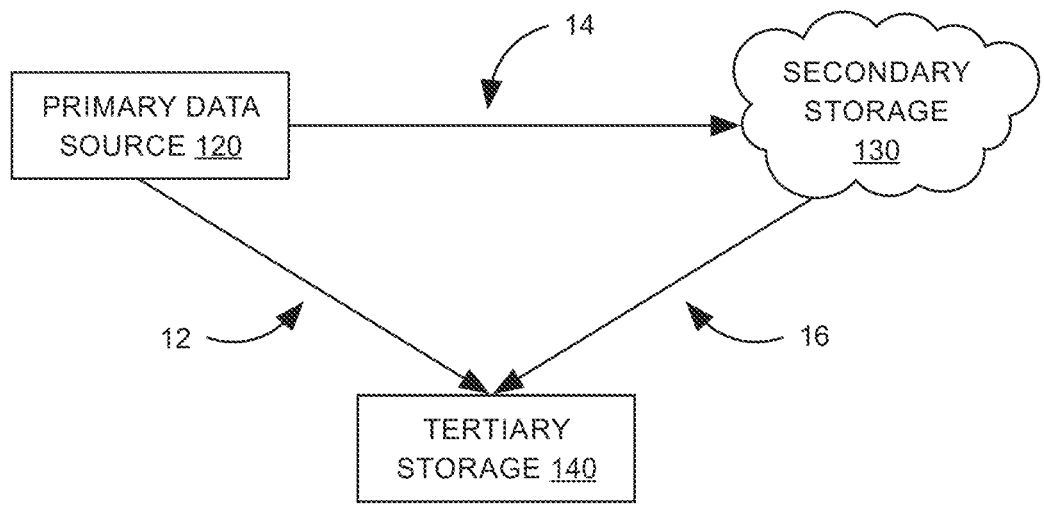
FIG. 3 is a block diagram illustrating an example of the two different paths available for the redundant data back up, according to some aspects of the present description.

The backup path selector 156 is further communicatively coupled to the parameter comparison module 154. The backup path selector 156 is configured to select a path for the redundant backup based on the comparison. The backup path selector 156 is configured to select a path for the redundant backup of the one or more data sets based on whether the current value of the backup parameter is less than or greater than the threshold limit. As shown in FIG. 3, the selected path comprises one of: (A) direct redundant backup of the data set from the client device to the tertiary storage 12, or (B) back up of the data set from the client device to a secondary storage 14 and redundant backup of the data set from the secondary storage to the tertiary storage 16.

In some embodiments, the backup parameter is a backup rate, and the backup path selector 156 is configured to select the path (A) if a current backup rate is greater than the corresponding threshold limit, and path (B) if the current backup rate is less than the corresponding threshold limit.

In some embodiments, the backup parameter is a backup cost per month, and the backup path selector 156 is configured to select the path (B) if a current backup cost is less than the corresponding threshold limit and path (A) if the current backup cost is greater than the corresponding threshold limit.

As described in detail later, the current backup cost may include a sum of an actual backup cost incurred and a projected additional cost. The projected additional cost may be determined at least in part based on a location of the tertiary storage.

Referring again to FIG. 2, the system 150 further includes a redundant backup module 158 configured to perform the redundant backup of the data set by dynamically switching between the backup paths based on the selected backup path. The term "dynamically switching" as used herein means switching between the two backup paths in real-time based on whether the backup parameter is less than or greater than the threshold limit.

Figure 4:
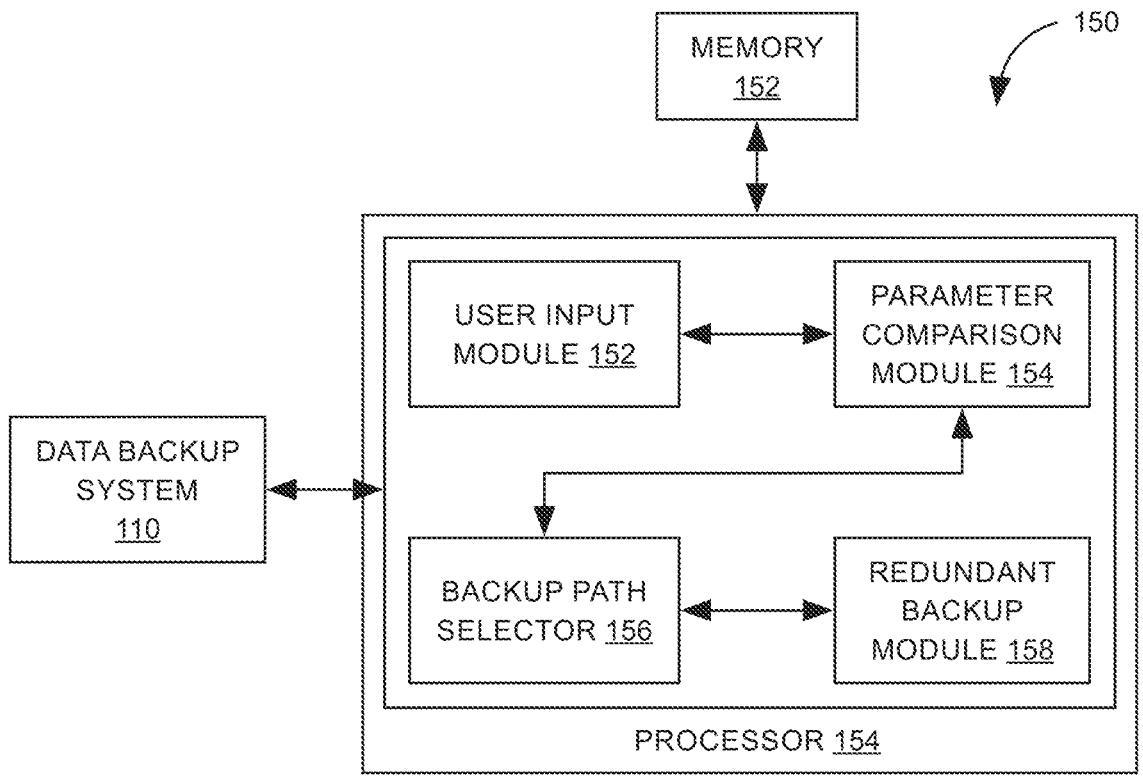
FIG. 4 is a flow chart illustrating an example method for redundant backup, according to some aspects of the present description.

Referring now to FIG. 4, a system 150 configured to dynamically optimize redundant backup of one or more data sets of a plurality of data sets from a client device to a tertiary storage is presented. The system 150 includes a memory 152 storing one or more processor-executable routines and a processor 154. The processor 154 includes a user input module 152, a parameter comparison module 154, a backup path selector 156, and a redundant backup module 158. Each of these components is described in detail earlier. The processor 154 is further configured to execute the processor-executable routines to perform the steps illustrated in the flow-chart of FIG. 5.

Figure 5:
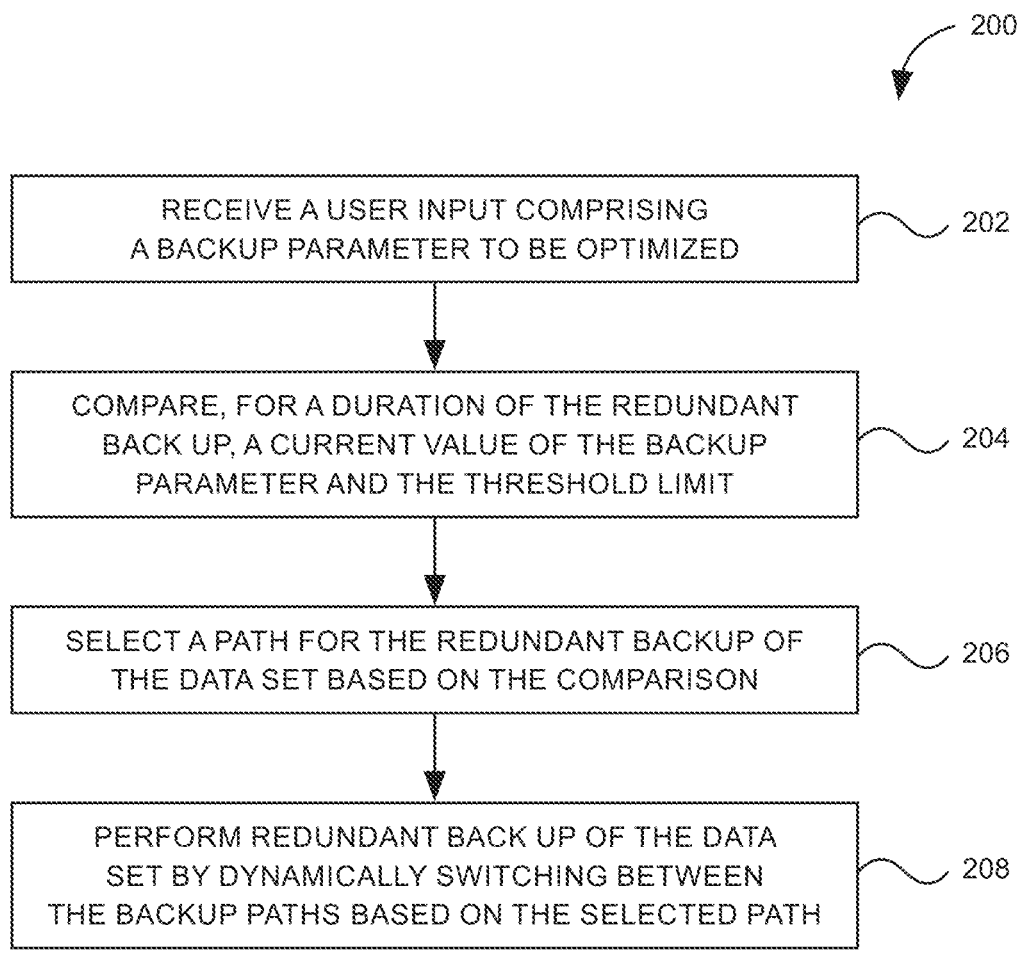
FIG. 5 is a flow chart illustrating an example method for selecting a redundant backup path, according to some aspects of the present description.

FIG. 5 is a flowchart illustrating a method 200 for dynamically optimizing redundant backup of one or more data sets of a plurality of data sets from a client device to a tertiary storage. The method 200 may be implemented using the redundant backup system 150 of FIGS. 1 and 4, according to some aspects of the present description. Each step of method 200 is described in detail below.

The method 200 includes, at block 202, receiving a user input including a backup parameter to be optimized for a dataset of the plurality of datasets and a threshold limit for the backup parameter. The backup parameter is a backup rate or a backup cost per month. As noted earlier, optimizing the backup rate may allow the user to optimize the performance of the redundant backup. Similarly, optimizing the backup cost per month may allow the user to optimize the redundant backup cost.

In some embodiments, the method 200 may further provide for changing the backup parameter between different data sets of the plurality of data sets. For example, the user may decide to optimize the backup rate (i.e., performance) for one or more data sets that may be critically important. For other datasets, the user may decide to optimize the cost per month thus optimizing both the performance and cost based on the dataset.

In some embodiments, the method 200 further includes receiving, from a user, a first backup parameter for an initial redundant backup of the data set and a second backup parameter for any subsequent incremental redundant backups of the dataset. For example, the user may decide to optimize the backup rate (i.e., performance) for initial full redundant backup. For any subsequent incremental redundant backups, the user may decide to optimize the cost per month thus optimizing both the performance and cost for the redundant backup.

The method 200 further includes, at block 204, comparing the current value of the backup parameter to the threshold limit. In some embodiments, the method 200 includes, at block 204, comparing the current value of the backup parameter to the threshold limit continuously. In some embodiments, the method 200 includes determining, for a duration of the redundant backup, whether a current value of the backup parameter is less than or greater than the threshold limit.

The method 200 further includes, at block 208, selecting a path for the redundant backup of the data set based on the comparison between the current value of the backup parameter and the threshold limit. In some embodiments, the method 200 includes selecting a path for the redundant backup of the data set based on whether the current value of the backup parameter is less than or greater than the threshold limit. As shown in FIG. 3, the selected path includes one of: (A) direct redundant backup of the data set from the client device to the tertiary storage 12, or (B) back up of the data set from the client device to a secondary storage 14 and redundant backup of the data set from the secondary storage to the tertiary storage 16.

Figure 6:
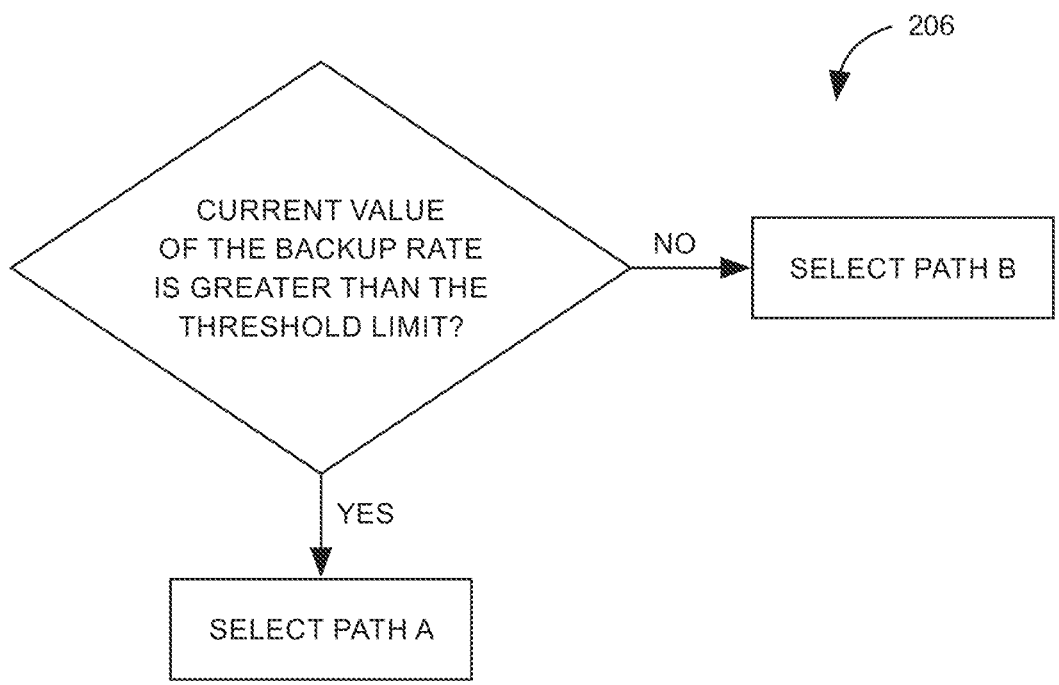
FIG. 6 is a flow chart illustrating an example method for selecting a redundant backup path, according to some aspects of the present description

In some embodiments, as shown in FIG. 6, the backup parameter is a backup rate, and the method 200 includes, at block 206, selecting a path (A) if a current backup rate is greater than the corresponding threshold limit and path (B) if the current backup rate is less than the corresponding threshold limit.

By way of example, a threshold limit for the backup rate may be provided by the user as 200 GB/hour. In such a scenario, the method 200 includes, at block 206, selecting a path (A) if the current backup rate is greater than 200 GB/hour, and path (B) if the current backup rate is less than 200 GB/hour. Thus, by selecting a backup path based on the backup rate, the method 200 optimizes performance.

Figure 7:
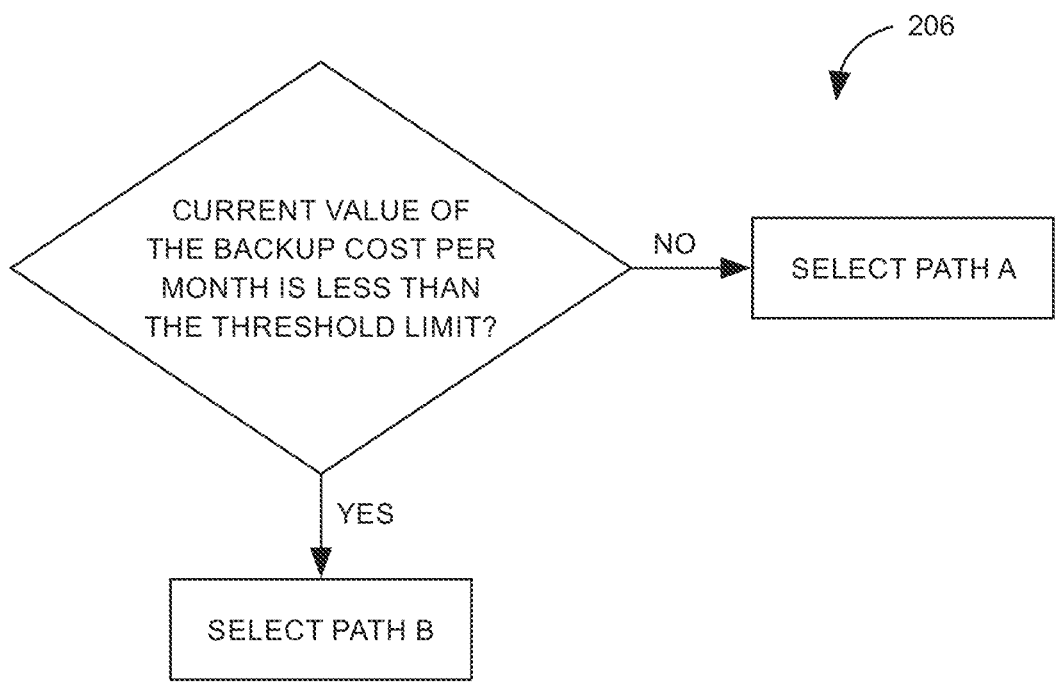
FIG. 7 is a block diagram illustrating an example redundant data backup system, according to some aspects of the present description.

In some embodiments, as shown in FIG. 7, the backup parameter is a backup cost per month, and the method 200 includes, at block 206, selecting a path (B) if a current backup cost is less than the corresponding threshold limit and path (A) if the current backup cost is greater than the corresponding threshold limit.

By way of example, a threshold limit for the backup cost may be provided by the user as $700/month. In such a scenario, the method 200 includes, at block 206, selecting a path (B) if the current backup cost is less than $700/month, and path (A) if the current backup cost is greater than $700/month. Thus, by selecting a backup path based on the backup cost, the method 200 optimizes cost In some embodiments, the current backup cost may include a sum of an actual backup cost incurred and a projected additional cost. The projected additional cost may be determined at least in part based on a location of the tertiary storage. This is further illustrated in FIG. 8.

Figure 8:
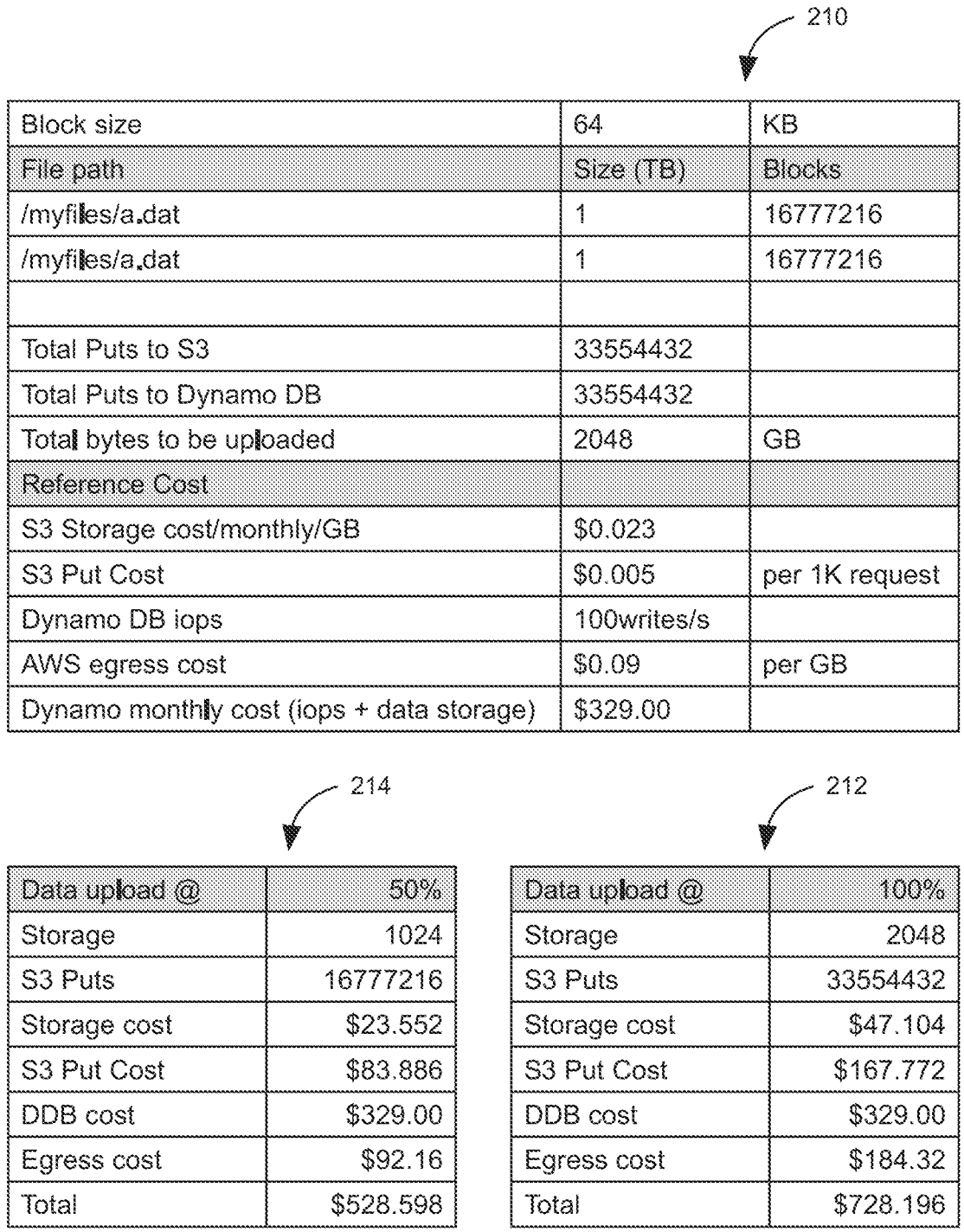
FIG. 8 shows an example calculation of current backup cost, according to some aspects of the present description.

FIG. 8 shows, at table 210, an example breakup of redundant backup cost for a scenario wherein two different data sets of 1 TB each have to be backed up. In the example shown in FIG. 8, the secondary storage is an AWS account and the tertiary storage is Amazon S3. Table 212 illustrates the actual backup cost at 50% data upload. Further, table 214 illustrates the total backup cost at 100% data upload, and thus the projected additional cost for 100% data load is actual backup cost subtracted from the total backup cost. For the example illustrated in FIG. 8, the method 200 includes, at block 206, selecting a path (B) until the sum of actual backup cost and projected additional cost is less than $700/month, and selecting path (A) once it reaches $700/month.

Referring again to FIG. 5, the method 200 further includes, at block 208, performing the redundant backup of the data set by dynamically switching between the backup paths based on the selected path. The term "dynamically switching" as used herein means switching between the two backup paths in real-time based on whether the backup parameter is less than or greater than the threshold limit.

The system and method as described herein with reference to FIGS. 1-7 provide for dynamically optimizing redundant backup of one or more data sets to a tertiary storage, based on objective-based rules. In some other embodiments, system and method for optimizing redundant backup of one or more data sets to a tertiary storage, based on static-based rules are also presented.

Figure 9:
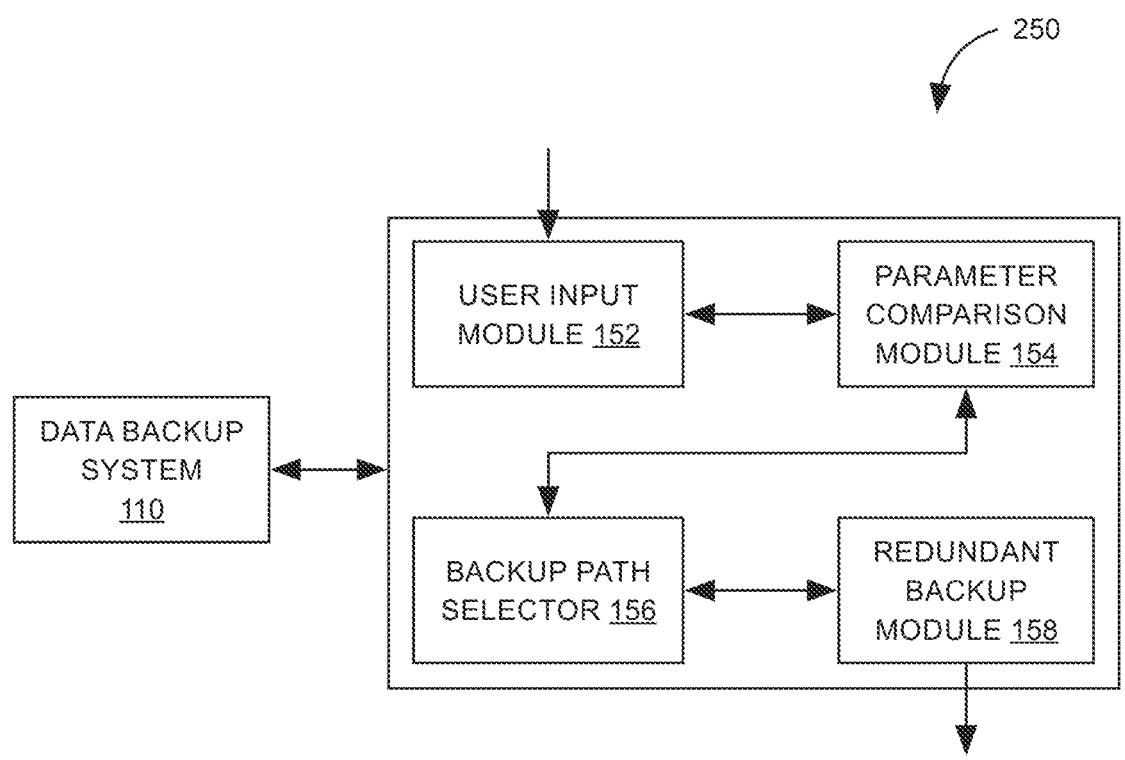
FIG. 9 is a block diagram illustrating an example redundant data backup system, according to some aspects of the present description.

Referring now to FIG. 9, a system 250 for optimizing redundant backup of one or more data sets of a plurality of data sets from a client device to a tertiary storage is presented. The system 250 includes a user input module 252, a parameter comparison module 254, a backup path selector 256, and a redundant backup module 258. Each of these components is described in detail below.

The user input module 252 is configured to receive, from a user, a threshold limit for an egress cost of transferring data from the client device 120 to the tertiary storage 140. The term "egress cost" as used herein refers to the cost incurred from transferring data out from the client device 120.

The parameter comparison module 254 is configured to compare the egress cost with the threshold limit. In some embodiments, the parameter comparison module 254 is configured to determine whether the egress cost is less than or greater than the threshold limit. The backup path selector 256 is configured to select a path for the redundant backup of the data set based on the comparison, e.g., whether the egress cost is less than or greater than the threshold limit.

Figure 10:
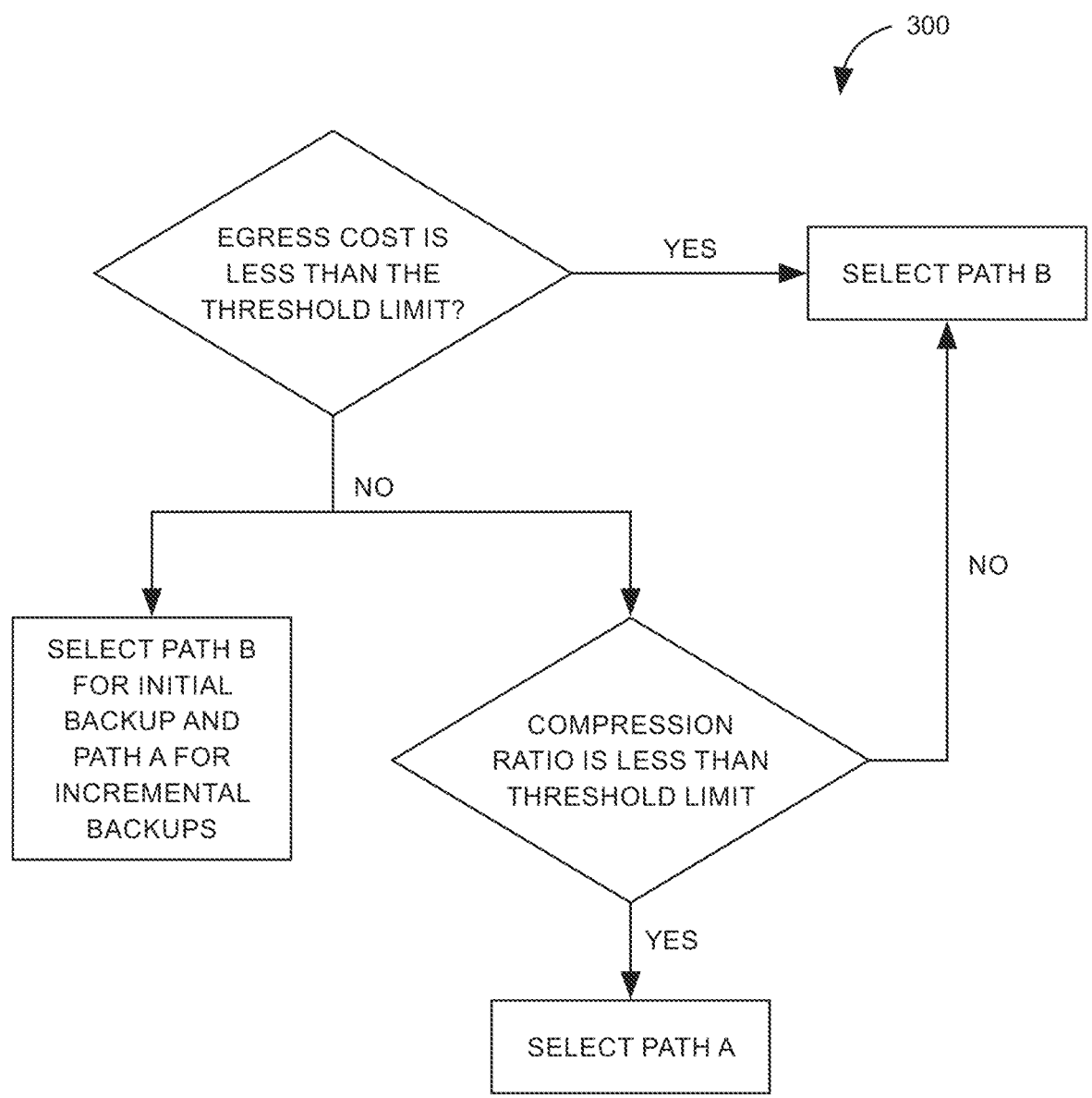
FIG. 10 is a flow chart illustrating an example method for selecting a redundant backup path, according to some aspects of the present description.

FIG. 10 shows a flowchart 300 for selecting a path for the redundant backup for some embodiments of the present description. As shown in FIG. 10, the backup path selector 156 is configured to select a path (B) if the egress cost is less than the threshold limit. Non-limiting examples of scenarios where egress cost may be less than the threshold limit include tertiary storage as on-premise storage, the client's AWS account, and the like.

In some embodiments, the backup path selector 156 is further configured to select path (B) for an initial backup and path (A) for any subsequent incremental backup if the egress cost is greater than the threshold limit. Thus, optimizing performance as well as cost.

In some other embodiments, if the egress cost is greater than the threshold limit, the parameter comparison module 154 is further configured to determine whether a chunk compression ratio is less than or greater than the threshold limit. In such embodiments, the backup path selector 156 is configured to select path (A) if the chunk compression ratio is less than the threshold limit, else path (B). This is further illustrated in FIG. 10.

Referring again to FIG. 9, the redundant backup module 258 is configured to perform the redundant backup of the data set based on the selected path.

Embodiments of the present description present solutions for creating redundant backup data blocks thus providing immutability of data. The systems and methods presented herein further provide for optimization of performance and/or cost during a redundant backup. Some embodiments provide for objective rules-based dynamic switching of backup paths that provide for further optimization.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 11:
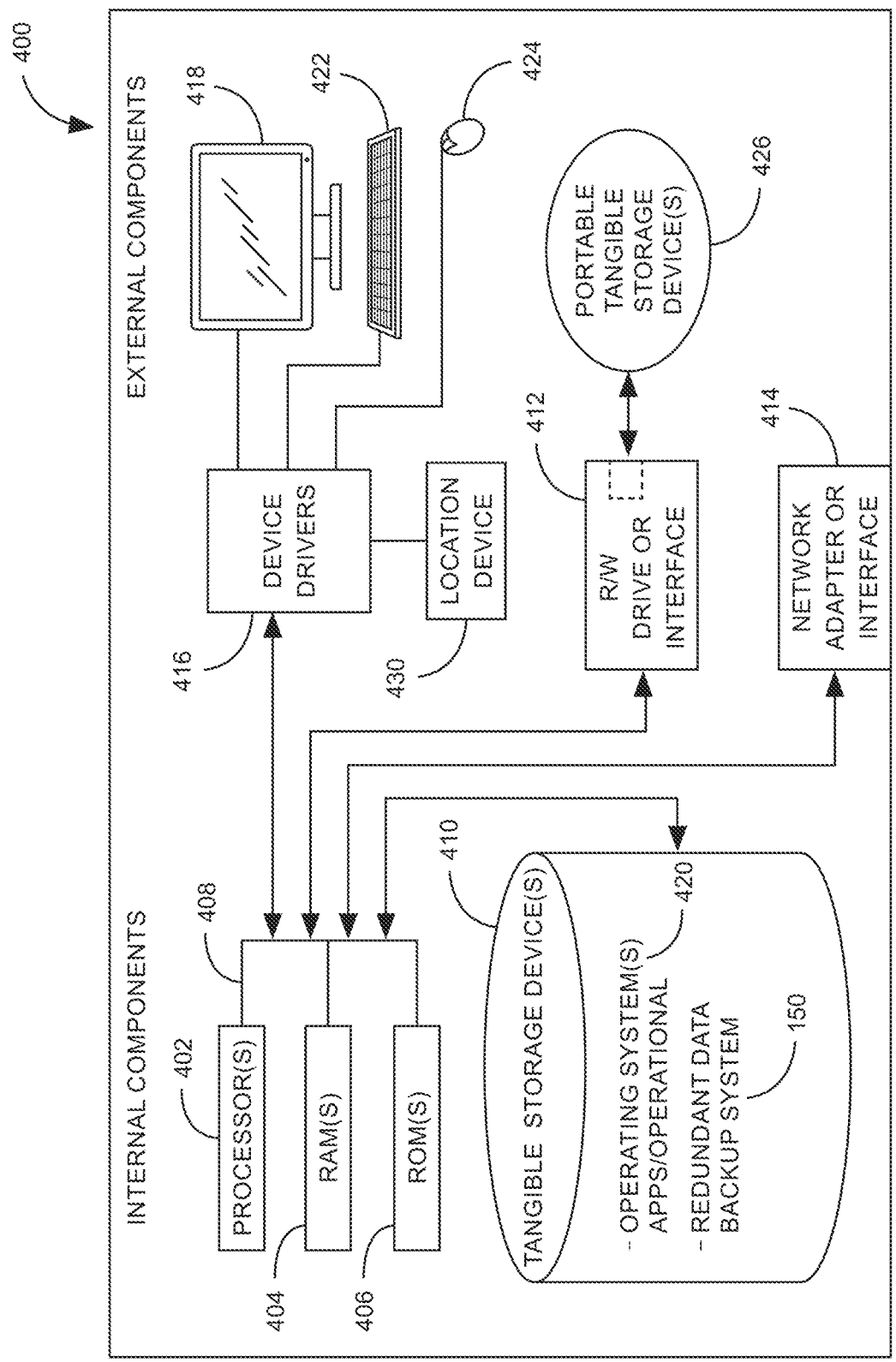
FIG. 11 is a block diagram illustrating an example computer system, according to some aspects of the present description.

One example of a computing system 400 is described below in FIG. 11. The computing system 400 includes one or more processor 402, one or more computer-readable RAMs 404 and one or more computer-readable ROMs 406 on one or more buses 408. Further, the computer system 408 includes a tangible storage device 410 that may be used to execute operating systems 420 and redundant data backup system 150. Both, the operating system 420 and the redundant data backup system 150 are executed by processor 402 via one or more respective RAMs 404 (which typically includes cache memory). The execution of the operating system 420 and/or redundant data backup system 150 by the processor 402, configures the processor 402 as a special-purpose processor configured to carry out the functionalities of the operation system 420 and/or the redundant data backup system 150, as described above.

Examples of storage devices 410 include semiconductor storage devices such as ROM 504, EPROM, flash memory or any other computer-readable tangible storage device that may store a computer program and digital information.

Computing system 400 also includes a R/W drive or interface 412 to read from and write to one or more portable computer-readable tangible storage devices 4246 such as a CD-ROM, DVD, memory stick or semiconductor storage device. Further, network adapters or interfaces 414 such as a TCP/IP adapter cards, wireless Wi-Fi interface cards, or 3G or 4G wireless interface cards or other wired or wireless communication links are also included in the computing system 400.

In one example embodiment, the 3D object generation system 100 redundant data backup system 150 may be stored in tangible storage device 410 and may be downloaded from an external computer via a network (for example, the Internet, a local area network or another wide area network) and network adapter or interface 414.

Computing system 400 further includes device drivers 416 to interface with input and output devices. The input and output devices may include a computer display monitor 418, a keyboard 422, a keypad, a touch screen, a computer mouse 424, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:

1. A system for dynamically optimizing redundant backup of one or more of a plurality of data sets from a client device to a tertiary storage, wherein the system is configured for:
receiving, from a user, a backup parameter to be optimized for one of the data sets and a corresponding threshold limit for the backup parameter;
comparing, for a duration of the redundant backup, a current value of the backup parameter versus the corresponding threshold limit;
selecting, based on the comparison, a path for the redundant backup of the one or more data sets, wherein the selected path is a first optional path or a second optional path, wherein the first optional path comprises a direct redundant backup of the one or more data sets from the client device to the tertiary storage, and the second optional path comprises a backup of the one or more data sets from the client device to a secondary storage and redundant backup of the one or more data sets from the secondary storage to the tertiary storage; and
redundantly backing up the one or more data sets by dynamically switching between the first optional path and the second optional path.

2. The system of claim 1, wherein the backup parameter is a backup rate or a backup cost per month.

3. The system of claim 1, wherein the backup parameter is a backup rate, the system being further configured to select the first optional path if a current backup rate is greater than the corresponding threshold limit, and to select the second optional path if the current backup rate is less than the corresponding threshold limit.

4. The system of claim 1, wherein the backup parameter is a backup cost per month, the system being further configured to select the second optional path if a current backup cost is less than the corresponding threshold limit and the first optional path if the current backup cost is greater than the corresponding threshold limit.

5. The system of claim 4, wherein the current backup cost comprises a sum of an actual backup cost incurred and a projected additional cost.

6. The system of claim 5, wherein the projected additional cost is determined at least in part based on a location of the tertiary storage.

7. The system of claim 1, wherein the system is further configured to allow the user to change the backup parameter between different data sets of the data sets.

8. The system of claim 1, wherein the system is further configured to allow the user to select a first backup parameter for an initial redundant backup of the one or more data sets and a second backup parameter for any subsequent incremental redundant backups of the one data set.

9. A method for dynamically optimizing redundant backup of one or more of a plurality of data sets from a client device to a tertiary storage the method comprising:
receiving a backup parameter to be optimized for one of the data sets and a corresponding threshold limit for the backup parameter;
comparing, for a duration of the redundant backup, a current value of the backup parameter versus the threshold limit;
selecting, based on the comparison, a path for the redundant backup of the one or more data sets, wherein the selected path is a first optional path or a second optional path, wherein the first optional path comprises a direct redundant backup of the one or more data sets from the data source to the tertiary storage, and the second optional path comprises a backup of the one or more data sets from the client device to a secondary storage and redundant backup of the one or more data sets from the secondary storage to the tertiary storage; and
performing redundant backup of the one or more data sets by dynamically switching between the first optional path and the second optional path.

10. The method of claim 9, wherein the backup parameter is a backup rate or a backup cost per month.

11. The method of claim 9, wherein the backup parameter is a backup rate, and the method comprises selecting the first optional path if a current backup rate is greater than the corresponding threshold limit and the second optional if the current backup rate is less than the corresponding threshold limit.

12. The method of claim 9, wherein the backup parameter is a backup cost per month, and the method comprises selecting the second optional path if a current backup cost is less than the corresponding threshold limit and the first optional path if the current backup cost is greater than the corresponding threshold limit.

13. The method of claim 12, wherein the current backup cost comprises a sum of an actual backup cost incurred and a projected additional cost.

14. The method of claim 13, wherein the projected additional cost is determined at least in part based on a location of the tertiary storage.

15. The method of claim 9, wherein the method further comprises changing the backup parameter between different data sets of the plurality of data sets.

16. The method of claim 9, wherein the method further comprises receiving, from the user, a first backup parameter for an initial redundant backup of the data set and a second backup parameter for any subsequent incremental redundant backups of the dataset.

17. A system configured for:
   optimizing redundant backup of one or more of a plurality of data sets from a client device to a tertiary storage;
   receiving, from a user, a threshold limit for an egress cost of transferring data from the client device to the tertiary storage;
   comparing the egress cost versus the threshold limit;
   selecting, based on the comparison, a path for the redundant backup of the one or more data sets, wherein the selected path is a first optional path or a second optional path, wherein the first optional path comprises a direct redundant backup of the one or more data sets from the client device to the tertiary storage, and the second optional path comprises a backup of the one or more data sets from the client device to a secondary storage and redundant backup of the one or more data sets from the secondary storage to the tertiary storage; and
   redundantly backing up the one or more data sets by dynamically switching between the first optional path and the second optional path.

18. The system of claim 17, wherein the system is further configured to select the second optional path if the egress cost is less than the threshold limit.

19. The system of claim 17, wherein the system is further configured to select the second optional path for an initial backup and the first optional path for any subsequent incremental backup if the egress cost is greater than the threshold limit.

20. The system of claim 17, wherein if the egress cost is greater than the threshold limit, the system is further configured to determine whether a chunk compression ratio is less than or greater than the threshold limit, and
   wherein the system is further configured to select the first optional if the chunk compression ratio is less than the threshold limit.

\* \* \* \* \*